(12) United States Patent
Kondo et al.

(10) Patent No.: US 8,882,079 B2
(45) Date of Patent: Nov. 11, 2014

(54) ELECTROMAGNETIC ACTUATOR

(75) Inventors: Jiro Kondo, Kariya (JP); Yoshiyuki Murao, Kariya (JP); Koichiro Matsumoto, Kyoto (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/609,916

(22) Filed: Sep. 11, 2012

(65) Prior Publication Data

US 2013/0068975 A1    Mar. 21, 2013

(30) Foreign Application Priority Data

Sep. 15, 2011 (JP) ................................. 2011-201761
Dec. 19, 2011 (JP) ................................. 2011-277264

(51) Int. Cl.

| | |
|---|---|
| F16K 31/02 | (2006.01) |
| F16K 31/06 | (2006.01) |
| H01F 7/08 | (2006.01) |
| H01F 7/13 | (2006.01) |
| F01L 1/344 | (2006.01) |
| F01L 1/34 | (2006.01) |

(52) U.S. Cl.
CPC ............ *F16K 31/0613* (2013.01); *H01F 7/081* (2013.01); *H01F 7/13* (2013.01); *F01L 1/3442* (2013.01); *F01L 1/34* (2013.01); *F01L 2001/3443* (2013.01); *F01L 2001/34426* (2013.01); *F01L 2001/34433* (2013.01)
USPC ..................... 251/129.15; 310/12.26; 335/261

(58) Field of Classification Search
USPC .................. 251/129.15; 310/14, 12.25, 12.26; 335/255, 261, 262
See application file for complete search history.

(56) References Cited

U.S. PATENT DOCUMENTS

| | | | | |
|---|---|---|---|---|
| 750,132 | A | * | 1/1904 | Timmis .......................... 335/261 |
| 6,615,780 | B1 | * | 9/2003 | Lin et al. ..................... 123/90.17 |
| 7,280,021 | B2 | * | 10/2007 | Nagasaki ....................... 335/255 |
| 8,264,312 | B2 | * | 9/2012 | Hamaoka et al. ............. 335/255 |
| 2002/0139951 | A1 | * | 10/2002 | Kawamura et al. ....... 251/129.15 |
| 2006/0000994 | A1 | * | 1/2006 | Kondo ..................... 251/129.15 |
| 2007/0158604 | A1 | | 7/2007 | Kondo et al. |
| 2011/0048348 | A1 | * | 3/2011 | Hase ........................... 123/90.15 |
| 2013/0009083 | A1 | * | 1/2013 | Ozaki et al. .............. 251/129.15 |

FOREIGN PATENT DOCUMENTS

| | | |
|---|---|---|
| JP | 06-031110 | 4/1994 |
| JP | 2003-188014 | 7/2003 |
| JP | 2004-301165 | 10/2004 |

OTHER PUBLICATIONS

Office Action (2 pages) dated Aug. 20, 2013, issued in corresponding Japanese Application No. 2011-277264 and English translation (3 pages).

(Continued)

*Primary Examiner* — John K Fristoe Jr.
*Assistant Examiner* — Matthew W Jellett
(74) *Attorney, Agent, or Firm* — Nixon & Vanderhye P.C.

(57) ABSTRACT

A stator is provided with a ring-shaped outer stator-projection and a ring-shaped inner stator-projection. A plunger is provided with a ring-shaped outer plunger-projection and a ring-shaped inner plunger-projection. A magnetic force is generated at three portions between the plunger and the stator. The inner stator-projection has a first tapered surface and the outer plunger-projection has a second tapered surface. The first tapered surface and the second tapered surface confront each other when the plunger moves toward the stator.

4 Claims, 8 Drawing Sheets

(56) References Cited

OTHER PUBLICATIONS

Office Action (2 pages) dated Dec. 24, 2013, issued in corresponding Japanese Application No. 2011-277264 and English translation (3 pages).

Office Action (7 pages) dated Dec. 17, 2013, issued in corresponding Chinese Application No. 201210342343.7 and English translation (6 pages).

* cited by examiner

ELECTROMAGNETIC ACTUATOR

CROSS-REFERENCE TO RELATED APPLICATIONS

This application is based on Japanese Patent Applications No. 2011-201761 filed on Sep. 15, 2011, and No. 2011-277264 filed on Dec. 19, 2011, the disclosures of which are incorporated herein by reference.

TECHNICAL FIELD

The present disclosure relates to an electromagnetic actuator which axially drives a subject. The electromagnetic actuator can be applied to a hydraulic control valve which has a plunger magnetically attracted.

In the following description, an axial direction of a plunger is referred to as a front-back direction, an attracted direction of the plunger is referred to as a front direction (leftward in FIGS. 1 and 6), and a repelled direction of the plunger is referred to as a back direction (rightward in FIGS. 1 and 6).

The front-back direction is used only for explanation but doe not represent an actual install direction of the actuator in a vehicle.

BACKGROUND

JP-2004-301165A shows a variable valve timing controller (VVT) which varies a rotational phase of a camshaft relative to a crankshaft of an internal combustion engine. The VVT is provided with a variable-camshaft-timing (VCT) mechanism which adjusts a rotational phase of an intake camshaft by using of a differential hydraulic pressure between a pressure in an advance chamber and a pressure in a retard chamber; and an oil flow control valve (OCV) which controls the differential hydraulic pressure. The OCV is one example of the electromagnetic spool valve.

Figure 8A:
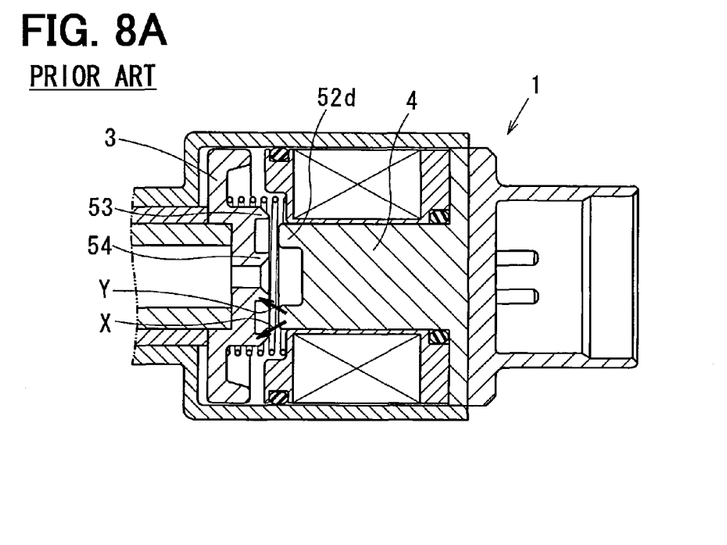
FIG. 8A is a longitudinal sectional view showing an essential part of a conventional electromagnetic actuator.
Figure 8B:
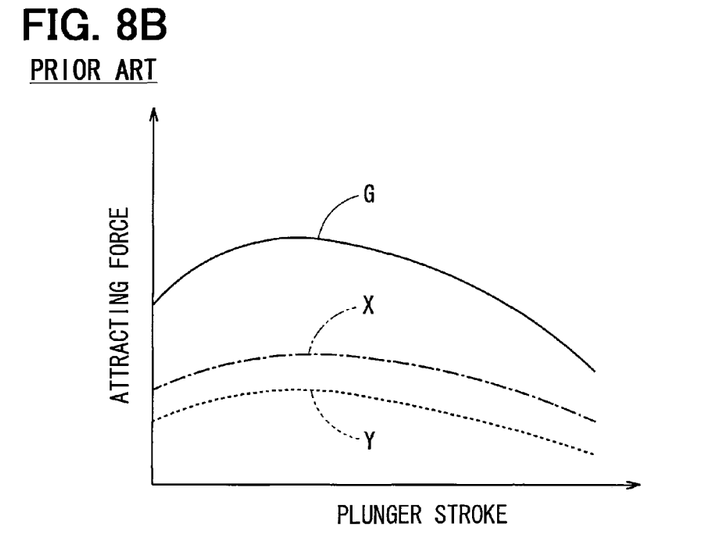
FIG. 8B is a graph showing a relationship between a stroke of plunger and a magnetic attracting force according to a conventional art.

The OCV includes a spool valve having four-way valve structure, and an electromagnetic actuator (linear solenoid) which drives the spool. Referring to FIG. 8, the conventional electromagnetic actuator will be described.

The electromagnetism actuator 1 has a plunger 3 and a stator 4 between which a magnetic attracting force is generated at multiple portions thereof. The plunger 3 can axially slide relative to the stator 4 from a position where the plunger 3 does not overlap with the stator 4 to another position where the plunger 3 overlaps with the stator 4.

In order to generate the magnetic attracting force at multiple portions, the plunger 3 has a ring-shaped outer plunger-projection 53 and a ring-shaped inner plunger-projection 54, and the stator 4 has a ring-shaped stator-projection 52d which is able to slide in between the outer and inner plunger-projections 53 and 54. Thereby, the magnetic attracting force is generated at a portion "X" between the outer plunger-projection 53 and the stator-projection 52d. Further, the magnetic attracting force is generated at a portion "Y" between the inner plunger-projection 54 and the stator-projection 52d.

As above, since the magnetic attracting force is generated at two portions "X" and "Y", a magnetic efficiency can be enhanced when starting to drive the plunger 3.

However, in the above configuration, the portion "X" is established when an inner circumferential wall of the outer plunger-projection 53 overlaps with an outer circumferential wall of the stator-projection 52d. Thus, as shown by a long dashed short dashed line "X" in FIG. 8B, as the plunger 3 comes closer to the stator 4, the magnetic attracting force is decreased at the portion "X".

Similarly, the portion "Y" is established when an outer circumferential wall of the inner plunger-projection 54 overlaps with an inner circumferential wall of the stator-projection 52d. Thus, as shown by a dashed line "Y" in FIG. 8B, as the plunger 3 comes closer to the stator 4, the magnetic attracting force is decreased at the portion "Y".

In the following description, the characteristic in which the magnetic attracting force is decreased as the plunger 3 comes closer to the stator 4 is referred to as a parabolic characteristic.

The plunger 3 receives a resultant force of the magnetic attracting forces generated at the portions "X" and "Y". After the plunger axially overlaps with the stator 4, the magnetic attracting force applied to the plunger 3 is decreased as the plunger comes closer to the stator, as shown by a solid line "G" in FIG. 8B. That is, although the magnetic efficiency can be enhanced at starting of driving the plunger 3, the magnetic attracting force is significantly decreased after the plunger 3 and the stator 4 overlap with each other.

SUMMARY

It is an object of the present disclosure to provide an electromagnetic actuator which is able to restrict a deterioration in plunger-driving force due to an increase in stroke of a plunger.

An electromagnetic actuator has a coil, a plunger, and a stator. A magnetic force is generated at multiple portions between the plunger and the stator. At least one of the multiple portions is configured by two tapered surfaces each of which confronts each other and is declined in a same direction with respect to an axial direction of the plunger.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
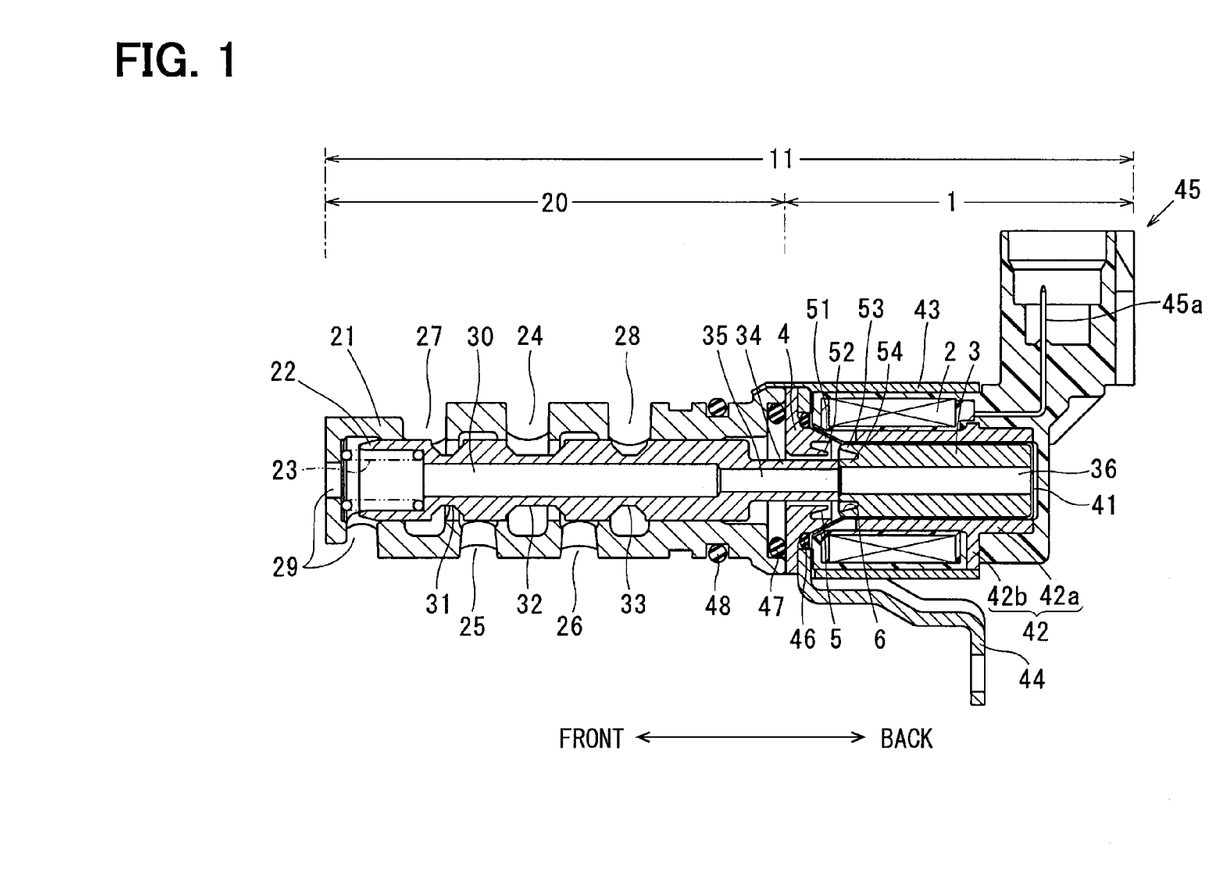
FIG. 1 is a longitudinal sectional view showing an electromagnetic actuator according to a first embodiment.
Figure 2A:
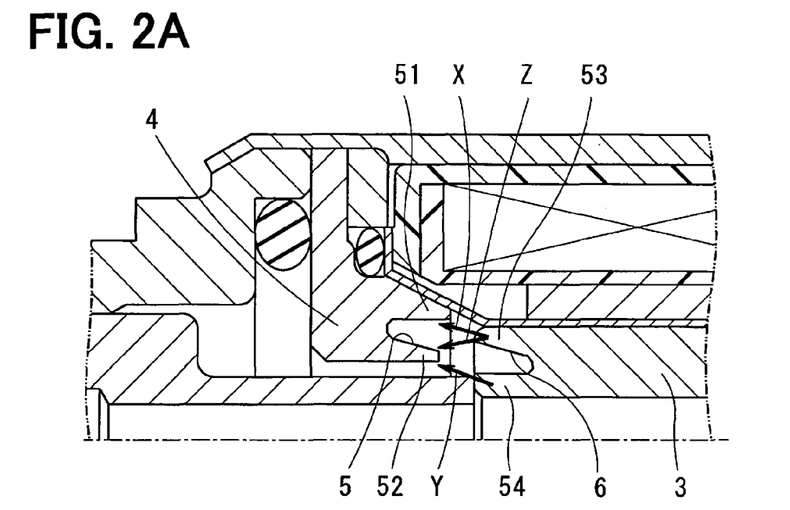
FIG. 2A is a longitudinal sectional view showing an essential part of the electromagnetic actuator according to the first embodiment.
Figure 2B:
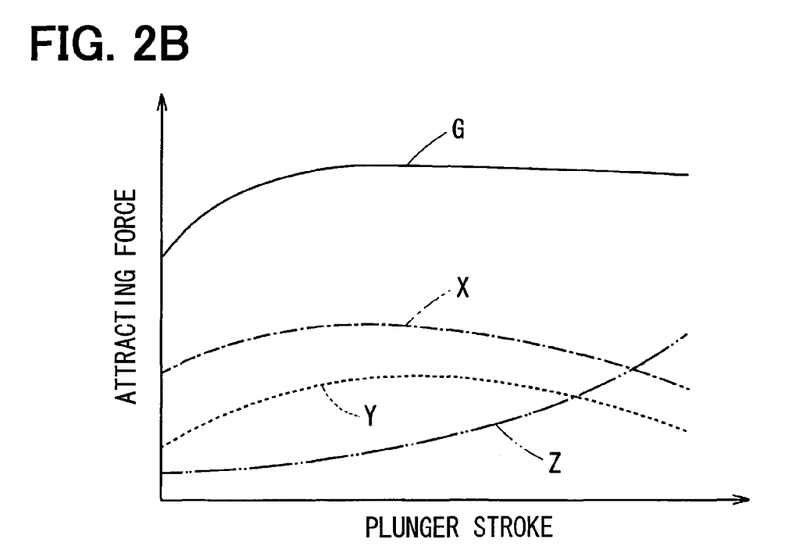
FIG. 2B is a graph showing a relationship between a stroke of plunger and a magnetic attracting force according to the first embodiment.
Figure 3:
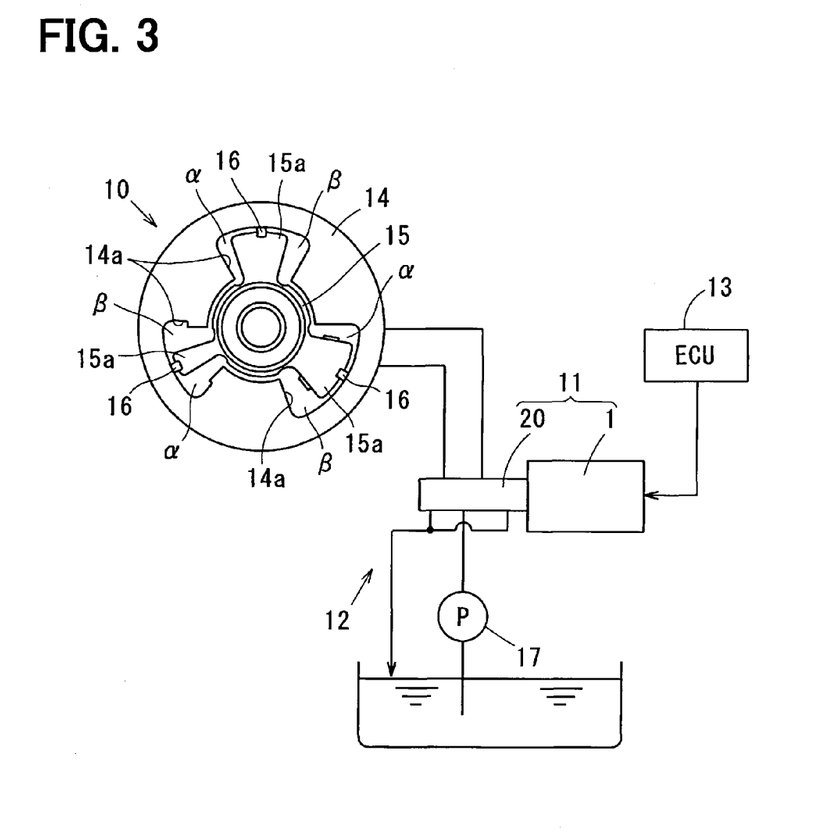
FIG. 3 is a schematic view showing a variable valve timing control system according to the first embodiment.

Referring to FIGS. 1 to 3, a first embodiment will be described hereinafter. A VVT-controller mounted to an engine has a VCT-mechanism 10 which is connected to an intake/exhaust camshaft and continuously varies a rotational phase of the camshaft relative to a crankshaft, whereby a valve timing of an intake/exhaust valve is continuously adjusted.

Further, the VVT-controller has a hydraulic circuit 12 including an oil control valve (OCV) 11 which hydraulically controls the VCT-mechanism 10a, and an electronic control unit (ECU) 13 which electrically controls the OCV 11.

The VCT-mechanism 10 has the shoe-housing 14 which is rotated in synchronization with a crankshaft of the engine, and the vane rotor 15 which rotates along with the camshaft relative to the shoe-housing 14. A hydraulic actuator in the shoe-housing 14 rotates the vane rotor 15 relative to the shoe-housing 14 so that a rotational phase of the camshaft is advanced or retarded.

The shoe-housing 14 is connected to a sprocket which is rotated by the crankshaft through a timing belt or a timing chain. As shown in FIG. 3, the shoe-housing 14 has three fan-shaped chambers 14a therein. The shoe-housing rotates clockwise in FIG. 3. The clockwise direction corresponds to an advance direction. The vane rotor 15 is connected to an end of the camshaft through a bolt so that the vane rotor 15 rotates along with the camshaft.

The vane rotor 15 has a plurality of vanes 15a, each of which divides corresponding fan-shaped chamber 14a of the shoe-housing 14 into an advance chamber $\alpha$ and a retard chamber $\beta$. The vane rotor 15 can rotate in a specified angle range relative to the shoe-housing 14. The advance chamber $\alpha$ is a hydraulic pressure chamber into which the working fluid (oil) is introduced in order to rotate the vane 15a in the advance direction. The retard chamber $\beta$ is also a hydraulic pressure chamber into which the working fluid is introduced in order to rotate the vane 15a in a retard direction. The advance chamber $\alpha$ and the retard chamber $\beta$ are liquid-tightly isolated from each other by a sealing member 16.

The hydraulic circuit 12 is configured such that the working fluid is introduced into or discharged from the advance chamber $\alpha$ and the retard chamber $\beta$ so that a differential pressure is generated between these chambers $\alpha$ and $\beta$ to rotate the vane rotor 15 relative to the shoe-housing 14. The OCV 11 controls the hydraulic pressure which an oil pump 17 feeds to the advance chamber $\alpha$ and the retard chamber $\beta$. The oil pump 17 is driven by the engine.

The OCV 11 is an electromagnetic spool valve which is comprised of a spool valve 20 and an electromagnetic actuator 1 driving the spool valve 20. The spool valve 20 is a four-way valve. The spool valve 20 is inserted into an OCV-hole formed in a cylinder head and the electromagnetic actuator 1 is fixed on an engine.

(Explanation of Spool Valve 20)

The spool valve 20 has a sleeve 21 inserted into the OCV-hole, a spool 22 slidably accommodated in the sleeve 21 in its axial direction in order to adjust a communicating condition of each port; and a return spring 23 biasing the spool 22 backward (leftward in FIG. 1).

The sleeve 21 is substantially cylindrical shape and is inserted into the OCV-hole through a small clearance. The sleeve 21 defines a cylindrical space in which the spool 22 axially slides. The sleeve 21 axially slidably supports the spool 22 therein.

The sleeve 21 has a plurality of input/output ports which extend radially. Specifically, the sleeve 21 has an input port 24 communicating with a discharge port of the oil pump 17, an advance port 25 communicating with the advance chamber $\alpha$, a retard port 26 communicating with the retard chamber 13, an advance drain port 27 communicating with a drain space, and a retard drain port 28 communicating with the drain space. The advance drain port 27, the advance port 25, the input port 24, the retard port 26 and the retard drain port 28 are arranged in this series from a front end of the sleeve 21 to a back end. Moreover, breathing ports 29 are formed at the front end of the sleeve. The breathing ports 29 communicate with the drain space.

The spool 22 is substantially cylindrical shape and is inserted into the sleeve 21 through a small clearance. The spool 22 has four large-diameter portions (lands) each of which outer diameter is substantially equal to an inner diameter of the sleeve 21 (diameter of the cylindrical space). Between each of the large-diameter portions, the spool 22 has a first small-diameter portion 31 for draining the advance chamber $\alpha$, a second small-diameter portion 32 for supplying hydraulic pressure, and a third small-diameter portion 33 for draining the retard chamber $\beta$.

As shown in FIG. 1, when the spool 22 is positioned at back side relative to its center position, the first small-diameter portion 31 communicates with the advance port 25 to discharge the working fluid in the advance chamber $\alpha$, whereby the hydraulic pressure in the advance chamber $\alpha$ is decreased.

The second small-diameter portion 32 always communicates with the input port 24. When the spool 22 moves forward, the input port 24 communicates with the advance port 25 through the second small-diameter portion 32 to increase the hydraulic pressure in the advance chamber $\alpha$. When the spool 22 moves backward, the input port 24 communicates with the retard port 26 through the second small-diameter portion 32 to increase the hydraulic pressure in the retard chamber $\beta$.

When the spool 22 is positioned at front side relative to its center position, the third small-diameter portion 33 communicates with the retard port 26 to discharge the working fluid in the retard chamber $\beta$, whereby the hydraulic pressure in the retard chamber $\beta$ is decreased.

Moreover, a large diameter portion between the first small-diameter portion 31 and the second small-diameter portion 32 has an axial length which is enough to close the advance port 25 when the spool 22 is positioned at a center position in its stroke. Similarly, a large diameter portion between the second small-diameter portion 32 and the third small-diameter portion 33 has an axial length which is enough to close the retard port 26 when the spool 22 is positioned at a center position in its stroke.

That is, when the spool 22 is positioned at the center position, both of the advance port 25 and the retard port 26 are closed at the same time.

According to a slide movement of the spool 22, following three conditions are attained.

(i) The retard port 26 communicates with the input port 24 and the advance port 25 communicates with the advance drain port 27, which is referred to as a retard condition.

(ii) The advance port 25 and the retard port 26 are closed, which is referred to as a phase holding condition.

(iii) The advance port 25 communicates with the input port 24 and the retard port 26 communicates with the retard drain port 28, which is referred to as an advance condition.

The spool 22 has a shaft portion 34 at its back end, which transmits a driving force of the plunger 3 to the spool 22. The shaft portion 34 can be formed independently from the spool 22.

The shaft portion 34 is cylindrical shape having a shaft breathing passage 35. The shaft breathing passage 35 connects a front space and a back space of the plunger 3, whereby volumes of both spaces can be variable.

Specifically, a front end of the shaft breathing passage 35 always communicates with the breathing ports 29 through a spool drain passage 30 which is formed along an axis of the spool 22. A rear end of the shaft breathing passage 35 always communicates, through a plunger breathing passage 36, with a variable volume chamber formed between a rear end of the plunger 3 and a cup guide 41. Furthermore, the shaft breathing passage 35 always communicates with a variable volume chamber formed around the shaft 34 through a radially formed breathing port (not shown).

(Explanation of Return Spring 23)

The return spring 23 is a compression coil spring biasing the spool 22 backward. The spool 22 has a spring chamber at its front end, in which the return spring 23 is disposed. The spring chamber always communicates with the drain space through the breathing ports 29.

(Explanation of Electromagnetic Actuator 1)

The electromagnetic actuator 1 is comprised of a coil 2, a plunger 3 and a stator 4. When the coil 2 is energized, a magnetic attracting force is generated so that the plunger 3 is attracted to the stator 4. That is, the magnetic attracting force is generated between the plunger 3 and the stator 4 at three portions (outer attracting portion "X", inner attracting portion "Y" and middle attracting portion "Z").

Specifically, the electromagnetic actuator 1 is provided with the coil 2, the plunger 3, the stator 4, the cup guide 41, a magnetic transfer stator 42, a yoke 43, a stay 44 and a connector 45.

The coil 2 is wound around a bobbin made of resin material.

The plunger 3 is a column made of magnetic material and is slidably supported in the cup guide 41.

The stator 4 is retained between the sleeve 21 and the coil 2. A magnetic gap is formed between the stator 4 and the plunger 3.

The magnetic transfer stator 42 made of magnetic material receives magnetism from the plunger 3 through the cup guide 41. The magnetic transfer stator 42 has a cylindrical portion 42a and a flange portion 42b which is magnetically connected to the yoke 43. A magnetic gap is formed between the cylindrical portion 42a and the plunger 3 in its radial direction.

The yoke 43 made of magnetic material is cylindrically formed to surround the coil 2 and is mechanically connected to the sleeve 21.

The cup guide 41 is made of non-magnetic material, such as stainless steel. The cup guide 41 restricts an oil leakage from an interior of the electromagnetic actuator 1. The cup guide 41 has a flange portion at its front end. The flange portion is clamped between an O-ring 46 and a top end of the connector 45.

An O-ring 47 is provided between a rear end of the sleeve 21 and a front end of the stator 4 to restrict an oil leakage from a clearance between the spool valve 20 and the actuator 1. Another O-ring 48 is provided at a rear periphery of the sleeve 21 to restrict an oil leakage from the OCV-hole.

The stay 44 is for fixing the OCV 11 on an engine component and is retained between the yoke 43 and the stator 4. The stay 44 may be connected to the yoke 43 by welding.

A connector 45 is made of the secondary resin material which molds the coil 2. The terminals 45a connected to the coil 2 are provided in the connector 45.

(Explanation of ECU 13)

The ECU 13 has functions of computing a target phase angle according to an engine driving condition and for detecting an actual phase angle of the vane rotor 15 relative to the shoe-housing 14. The ECU 13 energizes the coil 2 so that the actual phase angle becomes the target phase angle.

Specifically, the ECU 13 controls a duty ratio of current supplied to the coil 2. The axial position of the spool 22 is varied to control the hydraulic pressure in the advance chamber a and the retard chamber 13, whereby the advance quantity of the camshaft is controlled.

(Explanation of Attracting-Force Generation)

As described above, the stator 4 is made of magnetic material and attracts the plunger 3 forward. The stator has a disc portion retained between the sleeve 21 and the coil 2 and two ring-shaped stator-projections for introducing the magnetic flux to a vicinity of the plunger 3.

The stator-projections are annular projections projecting backward from a rear end of the stator 4. The stator-projections are comprised of an outer stator-projection 51 of which inner diameter is slightly larger than an outer diameter of the plunger 3 and an inner stator-projection 52 of which inner diameter is smaller than the outer diameter of the plunger 3 and is greater than an inner diameter of the plunger breathing passage 36.

The plunger 3 has an annular groove into which the inner stator-projection 52 can be contactlessly inserted. The annular groove is defined by two annular plunger-projections formed on the front end of the plunger 3.

The plunger-projections are comprised of: an outer plunger-projection 53 which is able to slide in between the outer stator-projection 51 and the inner stator-projection 52; and an inner plunger-projection 54 of which outer diameter is slightly smaller than the inner diameter of the inner stator-projection 52.

According to the above configuration, as shown in FIG. 2A, the outer attracting portion (magnetic gap) "X" is formed between the outer stator-projection 51 and the outer plunger-projection 53, the inner attracting portion "Y" is formed between the inner stator-projection 52 and the inner plunger-projection 54, and the middle attracting portion "Z" is formed between the inner stator-projection 52 and the outer plunger-projection 53.

When the coil 2 is energized, the plunger 3 moves forward and the magnetic attracting force is generated at the above portions "X", "Y" and "Z", whereby the magnetic efficiency can be enhanced.

In the above configuration, the portion "X" is formed in such a manner that the inner circumferential wall of the outer stator-projection 51 overlaps with an outer circumferential wall of the outer plunger-projection 53. Thus, as shown by a long dashed short dashed line "X" in FIG. 2B, after the outer stator-projection 51 overlaps with the outer plunger-projection 53, as the plunger 3 comes closer to the stator 4, the magnetic attracting force is decreased at the portion "X" (parabolic characteristic).

Similarly, the portion "Y" is formed in such a manner that an outer circumferential wall of the inner plunger-projection 54 overlaps with an inner circumferential wall of the stator-projection 52.

Thus, as shown by a dashed line "Y" in FIG. 2B, after the inner stator-projection 52 overlaps with the inner plunger-projection 54, as the plunger 3 comes closer to the stator 4, the magnetic attracting force is decreased at the portion "Y" (parabolic characteristic).

The stator 4 has a first tapered surface 5 which is declined with respect to an axial direction of the stator 4. The plunger 3 has a second tapered surface 6 which is declined in the same direction as the first tapered surface 5.

Specifically, the stator-projection 52 has the first tapered surface 5 on its outer circumferential surface. The first tapered surface 5 is declined backward. The outer plunger-projection 53 has the second tapered surface 6 on its inner circumferential surface. After the plunger 3 overlaps with the stator 4 in its axial direction, the first tapered surface 5 and the second tapered surface 6 confront each other in the axial direction and the radial direction.

Thus, even after the plunger 3 overlaps with the stator 4, as the plunger 3 comes closer to the stator 4 in the axial direction, the magnetic attracting force becomes greater at their confronting portion. That is, as shown by a long dashed double-short dashed line "Z" in FIG. 2B, after the plunger 3 overlaps with the stator 4, as the plunger 3 comes closer to the stator 4, the magnetic attracting force is increased at the portion "Z".

The plunger 3 receives a resultant force of the magnetic attracting forces generated at the portions "X", "Y" and "Z". The resultant attracting force applied to the plunger 3 is shown by a solid line "G" in FIG. 2B. After the plunger 3 slides by a specified amount from an initial position, the resultant attracting force applied to the plunger 3 becomes constant at high level.

As described above, according to the present embodiment, the magnetic efficiency can be enhanced when starting to drive the actuator 1. Thus, the actuator 1 can be made smaller in its size. Further, the attracting force applied to the plunger 3 can be made constant at high level.

Second Embodiment

Figure 4:
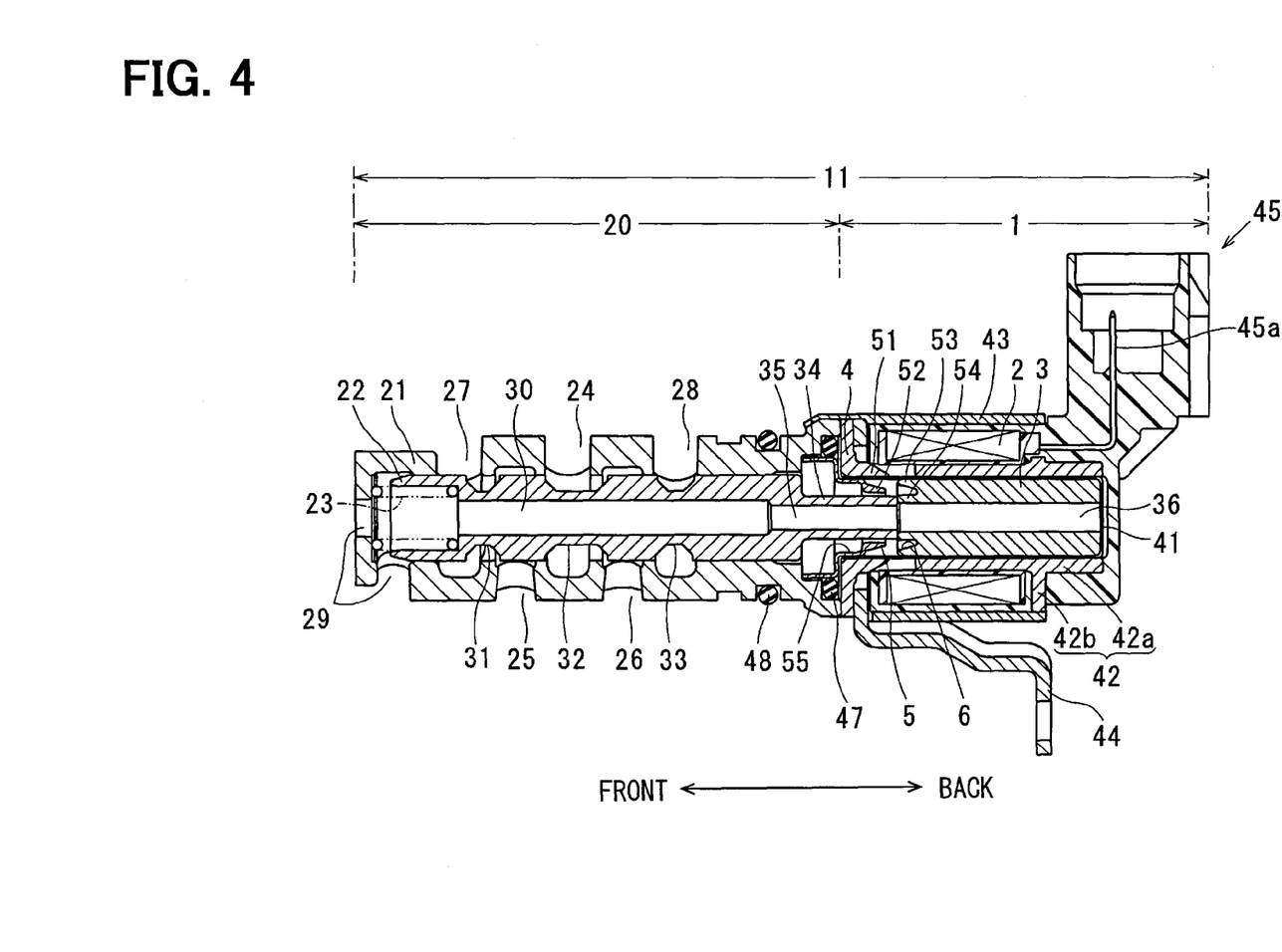
FIG. 4 is a longitudinal sectional view showing an electromagnetic actuator according to a second embodiment.
Figure 5:
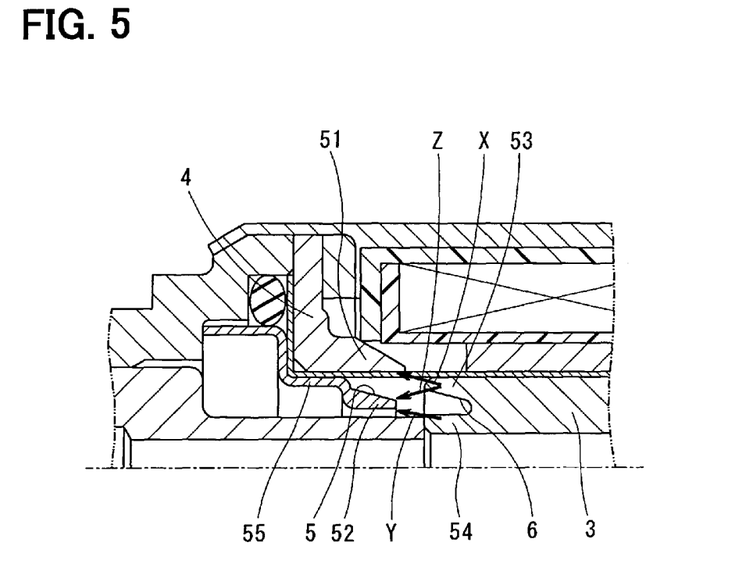
FIG. 5 is a longitudinal sectional view showing an essential part of the electromagnetic actuator according to the second embodiment.

Referring to FIGS. 4 and 5, a second embodiment will be described hereinafter. In each of the following embodiments, the same parts and components as those in the first embodiment are indicated with the same reference numerals.

According to the second embodiment, a sub-stator 55 is provided inside of the cup guide 41 to form the stator-projection 52. That is, the outer stator-projection 51 is provided outside of the cup guide 41 and the inner stator-projection 52 is provided inside of the cup guide 41.

Also in the second embodiment, the same advantage as the first embodiment can be obtained. Moreover, since the inner stator-projection 52 is provided inside of the cup guide 41, the flange portion of the cup guide 41 can be retained between the sleeve 21 and the stator 4, whereby the O-ring 47 can seal between the interior and the exterior of the cup guide 41 without another O-ring 46 shown in the first embodiment.

Third Embodiment

Figure 6:
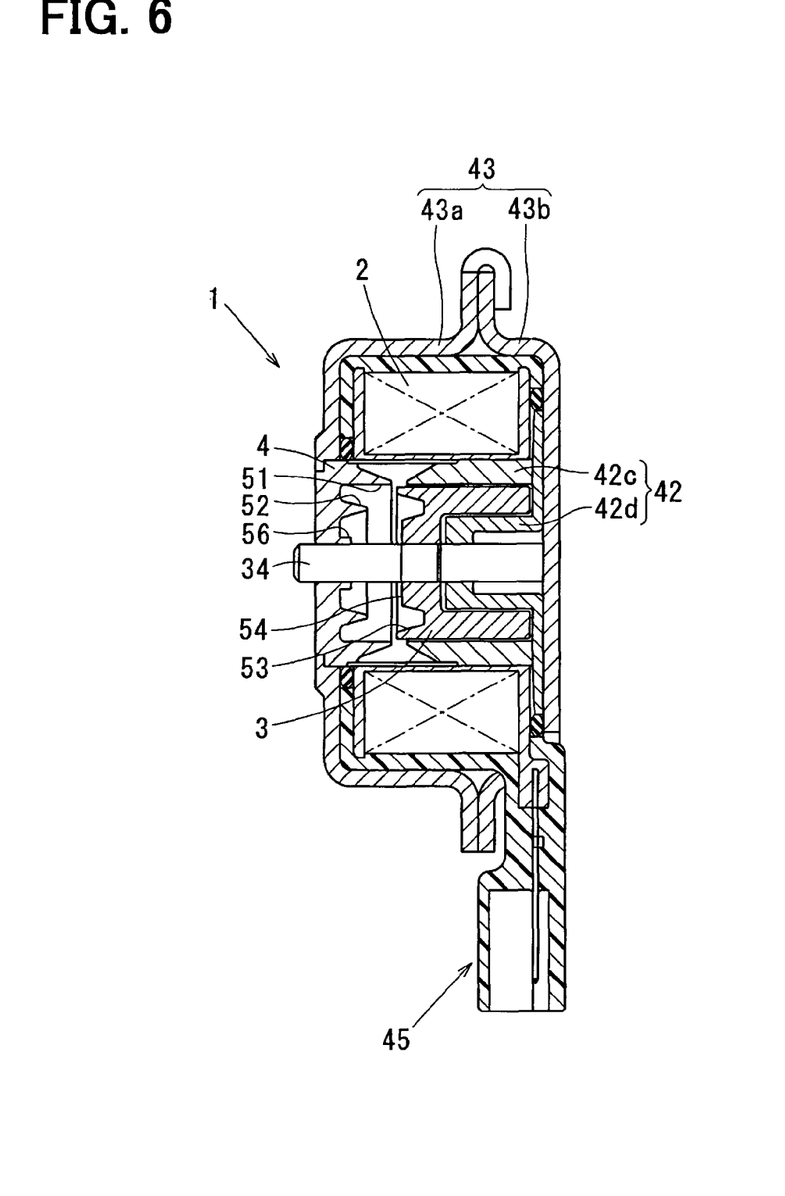
FIG. 6 is a longitudinal sectional view showing an electromagnetic actuator according to a third embodiment.
Figure 7A:
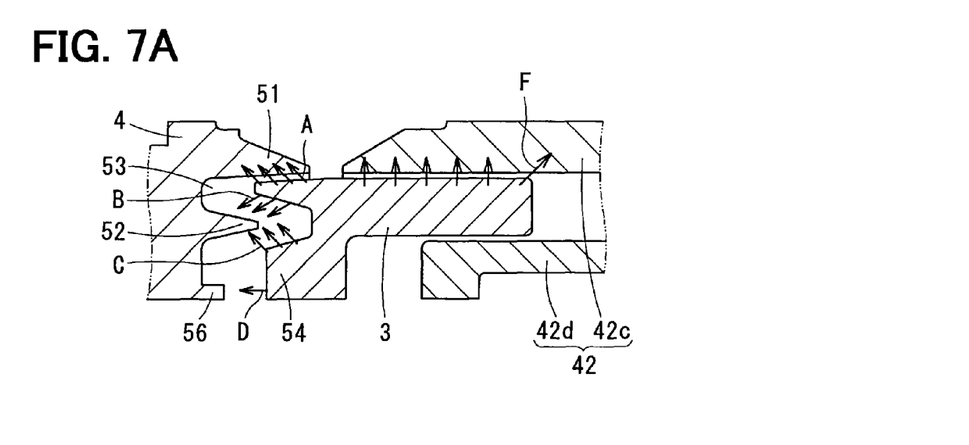
FIG. 7A is a longitudinal sectional view showing an essential part of the electromagnetic actuator according to the third embodiment.
Figure 7B:
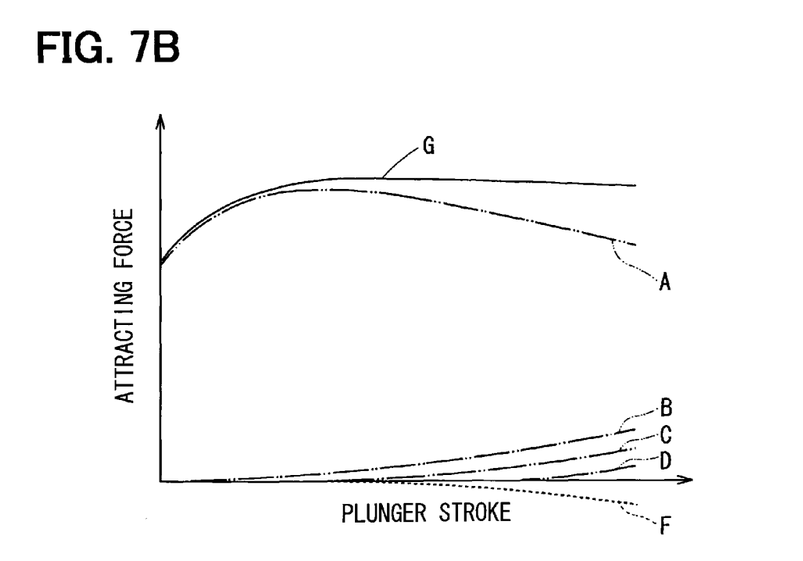
FIG. 7B is a graph showing a relationship between a stroke of plunger and a magnetic attracting force according to the third embodiment.

Referring to FIGS. 6, 7A and 7B, a third embodiment will be described hereinafter. The electromagnetic actuator 1 has a plunger 3 which is coaxial with a camshaft.

The electromagnetic actuator 1 is provided with the coil 2, the plunger 3, the stator 4, the magnetic transfer stator 42, the yoke 43 and the connector 45. The magnetic transfer stator 42 is comprised of an outer rear stator 42c and an inner rear stator 42d. The yoke 43 is comprised of a front yoke 43a and a rear yoke 43b.

The stator 4 has three stator-projections. The stator-projections are annular projections projecting backward from a rear end of the stator 4. The stator-projections are comprised of: an outer stator-projection 51 of which inner diameter is slightly larger than an outer diameter of the plunger 3; an inner stator-projection 52 of which inner diameter is smaller than the outer diameter of the plunger 3 and is greater than an inner diameter of the plunger 3; and a most inner stator-projection 56 of which inner diameter is almost the same as the most inner diameter of the plunger 3. The most inner stator-projection 56 may function as a shaft bush supporting the shaft 34.

The plunger 3 has the outer plunger-projection 53 and the inner plunger-projection 54.

When the coil 2 is energized, the magnetic attracting force is generated at a first portion "A", a second portion "B", a third portion "C" and a fourth portion "D" between the plunger 3 and the stator 4.

Specifically, as shown in FIG. 7A, the first portion "A" is formed between the projection 51 and the projection 53, the second portion "B" is formed between the projection 52 and the projection 53, the third portion "C" is formed between the projection 52 and the projection 54, and the fourth portion "D" is formed between the projection 56 and the projection 54.

An axial length of the projection 52 is shorter than that of the projection 51. An axial length of the projection 56 is shorter than that of the projection 52. An axial length of the projection 54 is shorter than that of the projection 53.

In the above configuration, the first portion "A" is formed in such a manner that the inner circumferential wall of the projection 51 overlaps with the outer circumferential wall of the projection 53 in the axial direction. Thus, as shown by a long dashed double-short dashed line "A" in FIG. 7A, the magnetic attracting force is decreased as the plunger 3 comes closer to the stator 4.

Meanwhile, in the present embodiment, the axial length of the plunger 3 is made shorter than the above embodiments. Thus, as shown in FIG. 7A, as a stroke of the plunger 3 becomes longer, a magnetic attracting force "F" is generated between the magnetic transfer stator 42 and the plunger 3. The magnetic attracting force "F" functions against the attracting force which attracts the plunger 3 toward the stator 4.

However, in the present embodiment, in addition to the first portion "A", the second to fourth portions "B" to "D" are formed, and the axial length of each portion "A" to "D" is different from each other. Thereby, the magnetic attracting force applied to the plunger 3 can be adjusted according to the stroke of the plunger 3.

A radial clearance of each portion "A" to "D" is also different from each other.

Furthermore, the confronting angle between the plunger 3 and the stator 4 at each portion "A" to "D" is varied to adjust the magnetic attracting force applied to the plunger 3. Specifically, at least one of the portions "A" to "D" has a tapered surface which declines with respect to the axial direction. The magnetic attracting force applied to the plunger 3 can be adjusted based on the number of tapered surface, a position of the tapered surface, a taper angle of the tapered surface and an area of the tapered surface. The magnetic attraction force which acts on the plunger 3 to the stroke of the plunger 3 can be adjusted.

Advantage of Third Embodiment

By appropriately setting the axial length, the radial distance, the confronting angle of the portions "A" to "D", the magnetic attracting force applied to the plunger 3 can be accurately adjusted.

In FIG. 7B, each of curved lines "A" to "D" indicates the attracting force applied to the plunger 3 at the portions "A" to "D" respectively. The dashed line "F" indicates the magnetic attracting force "F" which functions against the force attracting the plunger 3 toward the stator 4. The resultant force of the attracting forces "A" to "F" is indicated by a solid line "G" in FIG. 7B.

As above, after the plunger 3 slides by a specified amount from an initial position, the resultant attracting force "G" becomes constant at high level. Thus, the axial position of the plunger 3 can be accurately controlled.

[Modifications]

The taper angle of the first tapered surface 5 may be different from the taper angle of the second tapered surface 6. At least one of the tapered surfaces 5 and 6 may be formed by multiple tapered surfaces. The tapered surfaces 5 and 6 may be slightly curved.

The inner plunger-projection 54 or the outer stator-projection 51 may not be formed, so that the magnetic attracting force is generated at two portions between the plunger 3 and the stator 4.

Alternatively, the number of projections may be increased so that the magnetic attracting force is generated at four or more portions between the plunger 3 and the stator 4.

The electromagnetic actuator 1 may be applied to other than a variable valve timing controller.

The electromagnetic actuator 1 may drive a ball valve other than a spool valve.

The electromagnetic actuator 1 may drive a component other than a valve.

What is claimed is:

1. An electromagnetic actuator comprising:
   a coil for generating a magnetic force when energized; a plunger axially slidably supported; and
   a stator magnetically attracting the plunger in its axial direction when the coil is energized to generate the magnetic force; wherein:
   the magnetic force is generated at multiple attracting portions between the plunger and the stator;
   the stator is provided with a double-ring-shaped stator-projection axially projecting from the stator;
   the double-ring-shaped stator-projection is comprised of an outer stator-projection and an inner stator-projection concentrically;
   the plunger is provided with a double-ring-shaped plunger-projection axially projecting from the plunger;
   the double-ring-shaped plunger-projection is comprised of an outer plunger-projection and an inner plunger-projection concentrically;
   the inner stator-projection has an axial length which is shorter than that of the outer stator-projection;
   the inner plunger-projection has an axial length which is shorter than that of the outer plunger-projection;
   the double-ring-shaped stator-projection and the double-ring-shaped plunger-projection are able to slide into each other in such a manner that a first attracting portion is formed between the outer stator-projection and the outer plunger-projection, a second attracting portion is formed between the inner stator-projection and the outer plunger-projection, and a third attracting portion is formed between the inner stator-projection and the inner plunger-projection; and
   the first attracting portion has an axial length which is longer than that of the second attracting portion; and
   at least one of the first and second attracting portion is configured as two tapered surfaces confronting each other and being declined in a same direction with respect to an axial direction of the plunger.

2. An electromagnetic actuator according to claim 1, wherein
   the electromagnetic actuator actuates a valve.

3. An electromagnetic actuator according to claim 2, wherein
   the valve is a spool valve.

4. An electromagnetic actuator according to claim 3, wherein:
   the spool valve has an advance port communicating with an advance chamber of a variable valve timing mechanism and a retard port communicating with a retard chamber of the variable valve timing mechanism; and
   the spool valve controls a differential hydraulic pressure between the advance chamber and the retard chamber.

* * * * *